(12) United States Patent
Deno et al.

(10) Patent No.: US 9,403,494 B2
(45) Date of Patent: Aug. 2, 2016

(54) TOLERANCE ABSORBING STRUCTURE FOR WIRE HARNESS

(75) Inventors: Masahiro Deno, Shizuoka (JP); Yoshitaka Tsushima, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 13/147,481

(22) PCT Filed: May 13, 2010

(86) PCT No.: PCT/JP2010/058483
§ 371 (c)(1),
(2), (4) Date: Aug. 2, 2011

(87) PCT Pub. No.: WO2010/131773
PCT Pub. Date: Nov. 18, 2010

(65) Prior Publication Data
US 2011/0284266 A1 Nov. 24, 2011

(30) Foreign Application Priority Data
May 13, 2009 (JP) ................................ 2009-116538

(51) Int. Cl.
*H01B 7/24* (2006.01)
*B60R 16/02* (2006.01)

(52) U.S. Cl.
CPC .................................. *B60R 16/0215* (2013.01)

(58) Field of Classification Search
USPC ........... 174/136, 152 G, 68.3, 92, 99 R, 65 G, 174/138 G, 72 A, 74 R, 68.1; 74/502.6; 248/74.1, 49, 68.1
See application file for complete search history.

(56) References Cited

U.S. PATENT DOCUMENTS 4,306,698 A * 12/1981 Gonia ..................... F16G 11/00
174/153 G
4,685,350 A * 8/1987 Bauer et al. .................. 74/502.4
(Continued)

FOREIGN PATENT DOCUMENTS

CN 1727222 A 2/2006
CN 1903610 A 1/2007
(Continued)

OTHER PUBLICATIONS

International Search Report (PCT/ISA/210) issued on Sep. 6, 2010 in the International Patent Application No. PCT/JP2010/058483.
(Continued)

*Primary Examiner* — Jenny L Wagner
*Assistant Examiner* — Pete Lee
(74) *Attorney, Agent, or Firm* — Sughrue Mion, PLLC

(57) ABSTRACT

To provide a tolerance absorbing structure for a wire harness which can prevent in advance the assembling failure at the time of mounting wires on a vehicle and also can improve the assembling workability.

The tolerance absorbing structure includes a shield shell 29 which is formed in a cylindrical shape so as to have a fitting space therein and has a supporting piece 41 to be fastened by a vehicle stud bolt 39 and protruding in the direction perpendicular to the axis line of the fitting space, and an inner holder 31 which is fitted into the fitting space of the shield shell 29 along the axis line direction thereby to be held in a manner of being restricted from being separated from the shield shell 29 and has a wire holding hole extending in the axis line direction for fixing wires 23, 23 inserted therein, wherein the inner holder 31 is held within the fitting space of the shield shell 29 so as to have a movable space in the axis line direction.

4 Claims, 9 Drawing Sheets

(56) References Cited

U.S. PATENT DOCUMENTS

| | | | | |
|---|---|---|---|---|
| 4,889,326 | A * | 12/1989 | Bouhours | 267/140.14 |
| 5,736,677 | A | 4/1998 | Sato et al. | |
| 5,941,545 | A * | 8/1999 | Park | 280/86.758 |
| 6,189,407 | B1 * | 2/2001 | Champ et al. | 74/502.4 |
| 7,422,181 | B2 * | 9/2008 | Sußenbach | F16L 3/10 174/664 |
| 7,441,732 | B2 * | 10/2008 | Ferragut et al. | 248/74.1 |
| 8,141,454 | B2 * | 3/2012 | Ruhlander et al. | 74/502.6 |
| 2002/0000499 | A1 * | 1/2002 | Aoki | F16L 3/10 248/74.4 |
| 2005/0064757 | A1 * | 3/2005 | Kathan et al. | 439/357 |
| 2006/0237598 | A1 | 10/2006 | Ferragut et al. | |
| 2009/0093157 | A1 * | 4/2009 | Aoki et al. | 439/607 |

FOREIGN PATENT DOCUMENTS

| | | |
|---|---|---|
| JP | 8124441 A | 5/1996 |
| JP | 2985555 B2 | 12/1999 |
| JP | 2006-205818 A | 8/2006 |
| JP | 2007-177853 A | 7/2007 |

OTHER PUBLICATIONS

Office Action, dated Apr. 16, 2013, issued by the State Intellectual Property Office of the People's Republic of China in counterpart Chinese Application No. 201080008639.4.

* cited by examiner

TOLERANCE ABSORBING STRUCTURE FOR WIRE HARNESS

TECHNICAL FIELD

The present invention relates to the tolerance absorbing structure for a wire harness and, in particular, relates to an improved technique for preventing in advance the assembling failure at the time of mounting wires on a vehicle.

BACKGROUND ART

Many wires are disposed on a vehicle panel such as an automobile and these wires are fixed to the vehicle panel so as to prevent the vibration thereof in the running state of the vehicle and to dispose them at small and narrow spaces. Conventionally, such the fixing is performed in a manner, for example, that a flexible holder member is attached to the vehicle panel, then the holder member is wound around the wire and fixed (see PTL1, for example) or that a clamp holding the wire is fitted into a stud bolt of the vehicle (see PTL2, for example).

CITATION LIST

Patent Literature

[PTL1] JP-A-2006-205818
[PTL2] JP-A-2007-177853

SUMMARY OF INVENTION

Technical Problem

However, in each of the aforesaid fixing structures of the related arts, since the wires are fixed so as not to be able to move with respect to the vehicle panel, each of the tolerance of the wires and the assembling tolerance of assembled parts on the vehicle side can not be absorbed, so that there arises a problem that the assembling workability is not good. Further, even if the wire harness satisfies the size thereof at the time of fabricating it, since the assembling tolerance of the assembled parts on the vehicle side can not be absorbed at the time of mounting the wire harness on the vehicle, there may arise a failure of the assembling procedure.

The present invention is made in view of the aforesaid circumstances and an object of the invention is to provide a tolerance absorbing structure for a wire harness which can prevent in advance the assembling failure at the time of mounting wires on a vehicle and also can improve the assembling workability.

Solution to Problem

The aforesaid object of the invention can be attained by the following configurations.

(1) A tolerance absorbing structure for a wire harness, including:

a shield shell which is formed in a cylindrical shape so as to have a fitting space therein and has a supporting piece to be fastened by a vehicle stud bolt and protruding in a direction perpendicular to an axis line of the fitting space; and an inner holder which is fitted into the fitting space of the shield shell along the axis line direction thereby to be held in a manner of being restricted from being separated from the shield shell and has a wire holding hole extending in the axis line direction for fixing wires inserted therein; wherein the inner holder is held within the fitting space of the shield shell so as to have a movable space in the axis line direction.

According to the tolerance absorbing structure for the wire harness thus configured, when the shield shell is attached to the vehicle stud bolt via the supporting piece and when the inner holder fixing the wires within the fitting space thereof is inserted into the fitting space of the shield shell along the axis line direction, the inner holder is supported by a vehicle via the shield shell. In this case, the inner holder can be moved in the axis line direction with respect to the shield shell by an amount of the movable space, whereby the wires can be moved by the amount of the movable space with respect to the vehicle.

(2) The tolerance absorbing structure for a wire harness according to (1) is configured in a manner that an abutment surface and a lance engagement part are provided within the fitting space of the shield shell along the axis line direction in a manner of being separated to each other, wherein an abutment surface restriction part to be abutted against the abutment surface and a lance to be engaged with the lance engagement part are provided on a side surface of the inner holder in a manner of being separated to each other, and wherein a distance between the abutment surface and the lance engagement part is larger than a distance between the abutment surface restriction part and the lance.

According to the tolerance absorbing structure for the wire harness thus configured, when the inner holder is inserted into the shield shell, the lance elastically deforms and enters into the fitting space. Then, when the lance moves over the lance engagement part, the lance engages with the lance engagement part due to the elastic restoring force thereof. Thus, the inner holder is restricted from being separated from the shield shell toward the direction opposite to the insertion direction. On the other hand, when the inner holder is further moved toward the insertion direction, since the abutment surface restriction part formed in the forward direction of the lance of the inner holder abuts against the abutment surface formed at the fitting space of the shield shell, the inner holder is restricted from further moving in the insertion direction. Thus, the inner holder is movable with respect to the shield shell in the axis line direction by a distance between the abutment surface restriction part and the abutment surface and by a distance between the lance and the lance engagement part.

(3) The tolerance absorbing structure for a wire harness according to (1) or (2) is configured in a manner that the supporting piece of the shield shell is provided with a long hole for allowing the shield shell to relatively move in the axis line direction with respect to the vehicle stud bolt.

According to the tolerance absorbing structure for the wire harness thus configured, although the inner holder becomes movable in the axis line direction with respect to the shield shell, since the shield shell becomes also movable in the axis line direction with respect to the vehicle stud bolt via the long hole, the movable range of the wires with respect to the vehicle increases by the movable distance due to the long hole in addition to the movable distance of the inner holder with respect to the shield shell.

Advantageous Effects of Invention

According to the tolerance absorbing structure for the wire harness of the invention, since the inner holder is held within the fitting space in a manner of being movable in the axis line direction, the assembling failure at the time of mounting the wires on the vehicle can be prevented in advance. Further, since the assembling space can be saved due to the effects of the tolerance absorbance, the workability of the assembling procedure can be improved.

DESCRIPTION OF EMBODIMENTS

Hereinafter, an embodiment according to the invention will be explained with reference to drawings.

Figure 1:
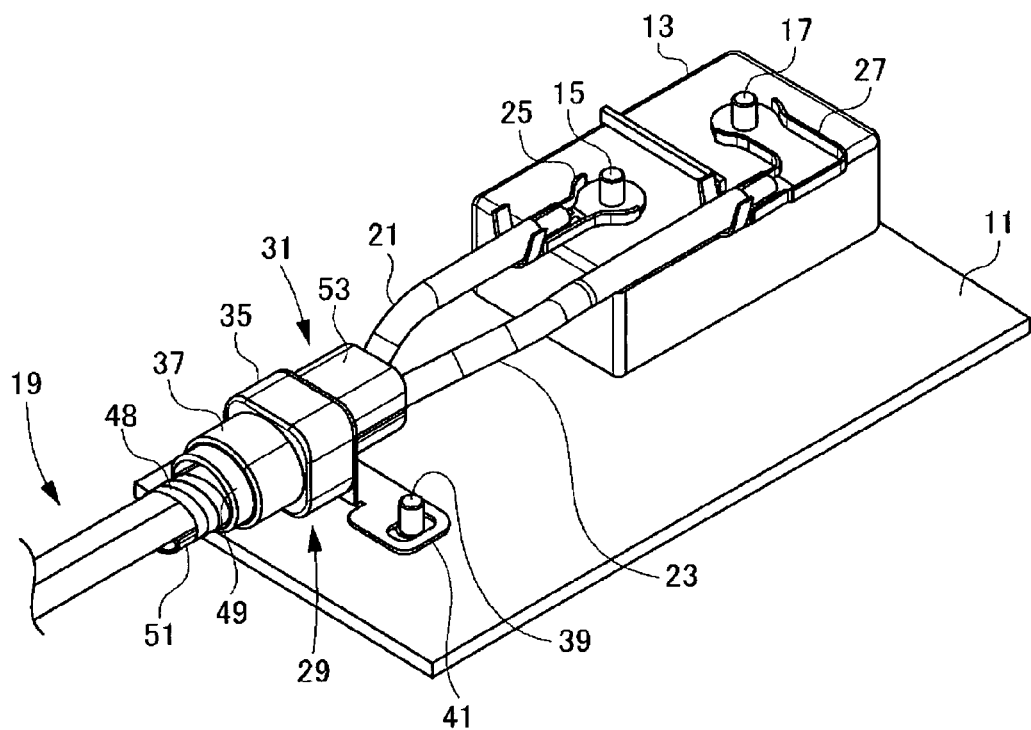
FIG. 1 is a perspective view of a wire harness attached to a vehicle panel so as to have a tolerance absorbing structure for the wire harness according to the invention.

FIG. 1 is a perspective view of a wire harness attached to a vehicle panel so as to have a tolerance absorbing structure for the wire harness according to the invention.

A vehicle panel 11 is provided with a battery shield terminal part 13 so as to protrude from the panel surface and the terminal part 13 is provided with erected terminals 15, 17 on the upper surface of the terminal part 13. The elected terminals 15, 17 are disposed so as to be separated to each other along the wiring direction of a high-voltage wire harness 19 which is disposed almost in a straight line manner. The high-voltage wire harness 19 is formed by a plurality of (two in this embodiment) wires 21, 23. A round terminal 25 is coupled to the conductor of the one wire 21 and an L-shaped round terminal 27 is coupled to the conductor of the other wire 23.

In the high-voltage wire harness 19, the one wire 21 is coupled to the terminal 15 via the round terminal 25 and the other wire 23 is coupled to the terminal 17 via the L-shaped round terminal 27. The high-voltage wire harness 19 is attached to the vehicle panel 11 via a shield shell 29 and an inner holder 31 near the terminal part 13.

Figure 2:
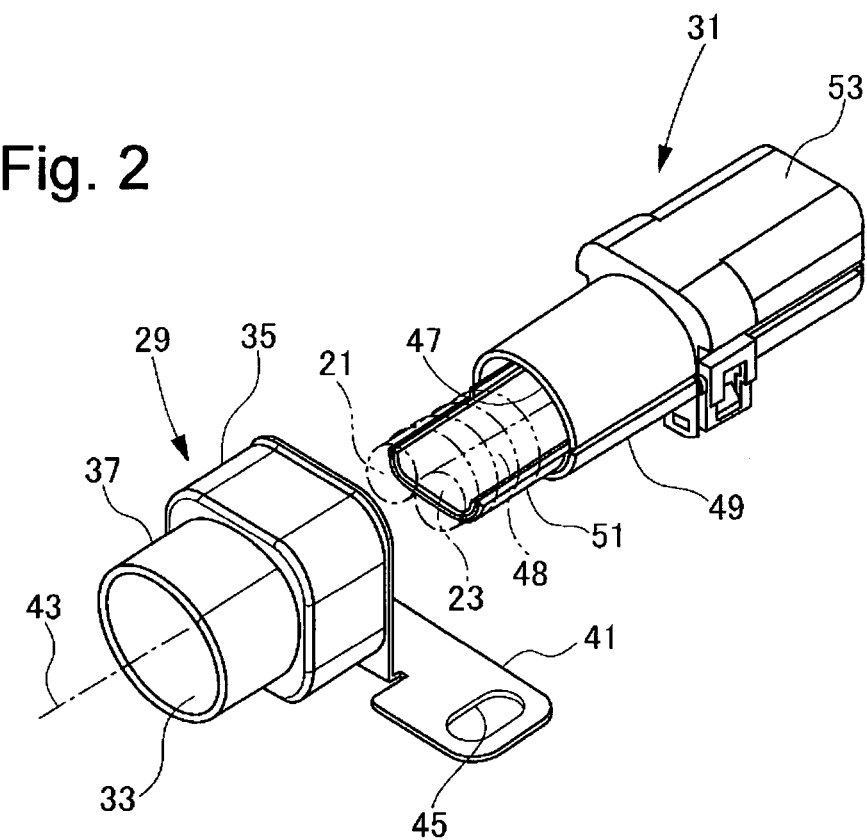
FIG. 2 is an exploded perspective view of a shield shell and an inner holder.

FIG. 2 is an exploded perspective view of the shield shell and the inner holder.

The shield shell 29 is formed by metal material and configured in a cylindrical shape having a fitting space 33 at the inside of the shield shell 29. The shield shell 29 is configured by a main body part 35 of a rectangular cylindrical shape and a small diameter part 37 of an elliptical cylindrical shape disposed coaxially. A supporting piece 41 to be fastened by a vehicle stud bolt 39 shown in FIG. 1 is provided on the end surface of the main body part 35 so as to protrude in the direction orthogonal to the axis line 43 of the fitting space 33. The supporting piece 41 of the shield shell 29 is provided with a long hole 45 for allowing the shield shell 29 to relatively move in the direction of the axis line 43 with respect to the vehicle stud bolt 39.

Figure 3:
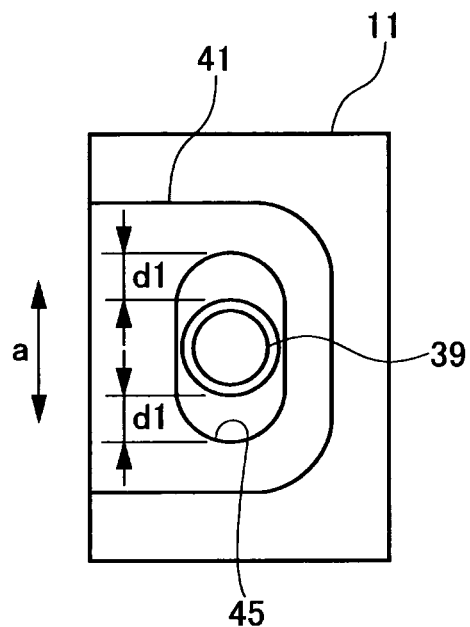
FIG. 3 is a plan view showing a fastening part between the shield shell and a vehicle stud bolt.

FIG. 3 is a plan view showing a fastening part between the shield shell and the vehicle stud bolt.

As explained later in detail, although the inner holder 31 is movable in the direction of the axis line 43 with respect to the shield shell 29, since the shall 29 is also movable via the long hole 45 in the direction of the axis line 43 (an arrow a direction in FIG. 3) with respect to the vehicle stud bolt 39, the movable range of the wires 21, 23 with respect to the vehicle is expanded by an amount which is a sum of the movable ranges of the inner holder 31 and the shield shell 29 and the movable range due to the long hole 45.

The inner holder 31 fits in the fitting space 33 from the one side (upper right side in FIG. 2) of the shield shell 29 along the direction of the axis line 43 and is held by a lance described later in a manner of being restricted from being separated from the shield shell 29. The inner holder 31 includes, within a sleeve 49, a wire holding hole 47 for inserting and holding the wires 21, 23 therein along the direction of the axis line 43. A wire placing piece 51 for winding the wires 21, 23 by a tape 48 to thereby fixedly holding the wires is extended from the wire holding hole 47. The sleeve 49 and the wire placing piece 51 are extruded from the small diameter part 37 in a fitted state with the shield shell 29.

The inner holder 31 is configured in a manner that the sleeve 49 is provided so as to continue to a holder main body 53. The holder main body 53 has a diameter larger than that of the sleeve 49 so as to form a step part. The step part at the lower part of the holder main body 53 forms an abutment surface restriction part 55 (see FIGS. 5(a), (b), and (c)).

Figure 4:
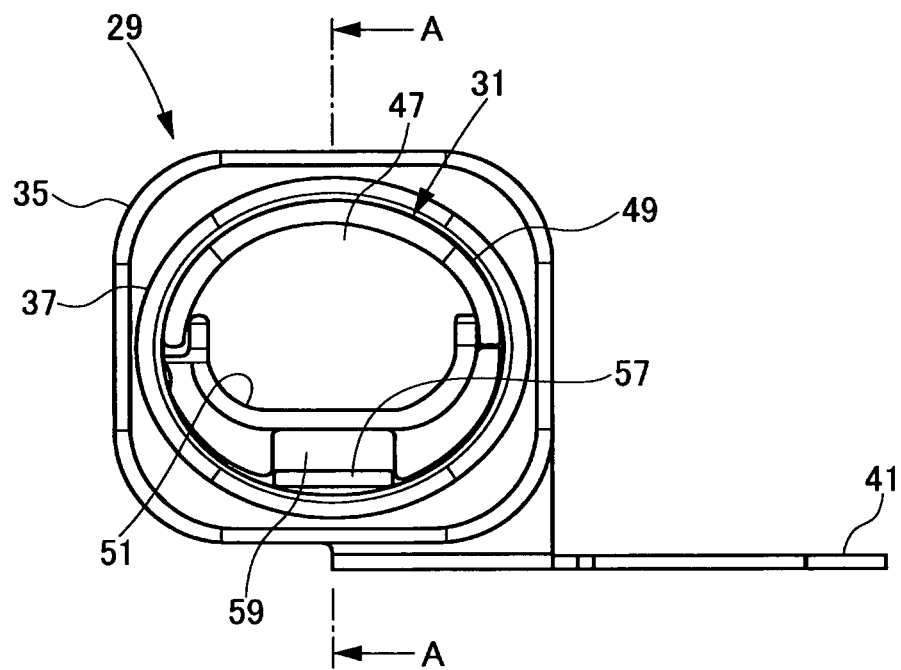
FIG. 4 is a sectional diagram of the shield shell and the inner holder thus fitted along the direction perpendicular to an axis line direction.

FIG. 4 is a sectional diagram of the shield shell and the inner holder thus fitted along the direction perpendicular to the axis line direction. The lance 57, which is protruded in the insertion direction and supported in a cantilever manner, is provided at the lower part of the holder main body 53 of the inner holder 31. The lance 57 can be deformed toward a flexible space 59 formed on the upper side thereof. When the inner holder 31 is inserted into the fitting space 33 of the shield shell 29, the inner holder is restricted from being separated from the shield shell 29 due to the engagement of the lance 57.

Figure 5A:
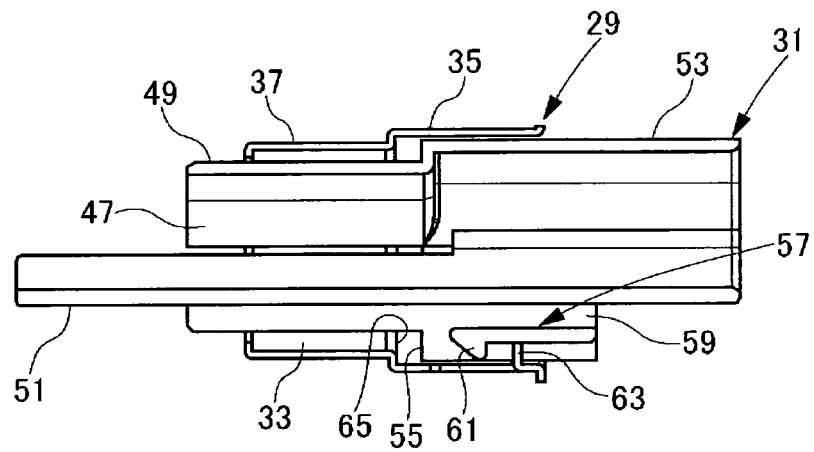
FIGS. 5(a), (b), and (c) are sectional diagrams seen along a line A-A in FIG. 4 in which different relative positions between the shield shell and the inner holder within a movable space are shown by (a), (b) and (c), respectively.
Figure 5B:
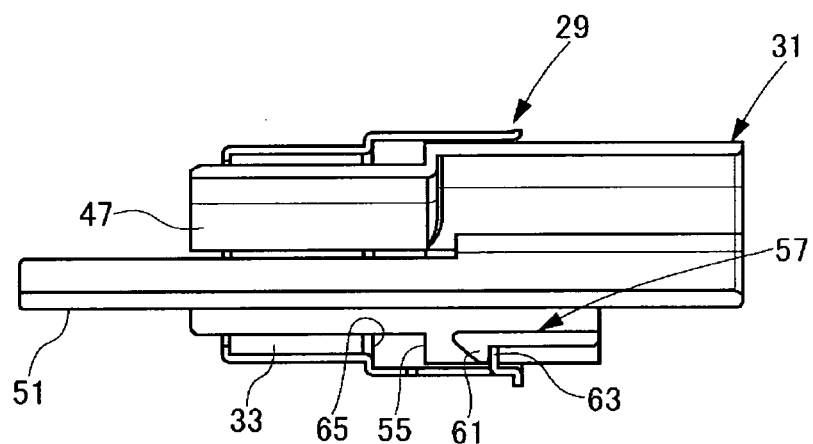
Figure 5C:
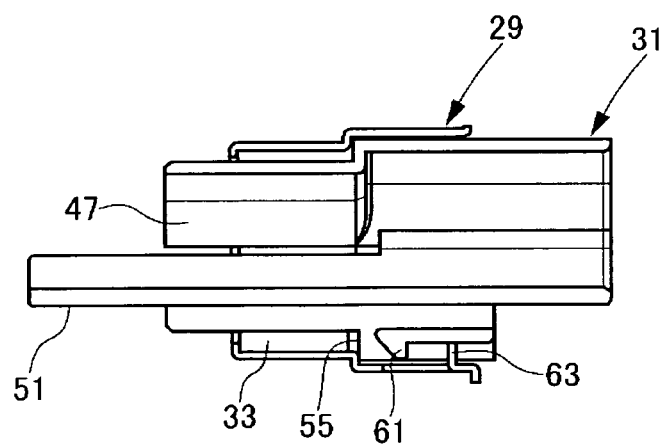

FIGS. 5(a), (b), and (c) are sectional diagrams seen along a line A-A in FIG. 4 in which different relative positions between the shield shell and the inner holder within a movable space are shown by (a), (b) and (c), respectively. The lance 57 provided at the holder main body 53 of the inner holder 31 has a nail part 61 directed downward. The nail part 61 engages with a lance engagement part 63 formed at the main body part 35 of the shield shell 29. The abutment surface restriction part 55 forming the lower step part of the holder main body 53 abuts against an abutment surface 65 which is a step part between the small diameter part 37 and the main body part 35 of the shield shell 29.

That is, the abutment surface 65 and the lance engagement part 63 are provided in the fitting space 33 of the shield shell 29 in a separated manner along the direction of the axis line 43. The abutment surface restriction part 55 abutting against the abutment surface 65 and the lance 57 engaging with the lance engagement part 63 are provided on the side surface (lower surface) of the inner holder 31 in a separated manner along the direction of the axis line 43. A distance L1 (see FIG. 11(c)) between the abutment surface 65 and the lance engagement part 63 is set to be larger than a distance L2 between the abutment surface restriction part 55 and the lance 57. In other words, the inner holder 31 is held in the fitting space 33 of the shield shell 29 so as to have movable spaces d2, d3 in which the inner holder is movable along the direction of the axis line 43.

Figure 6:
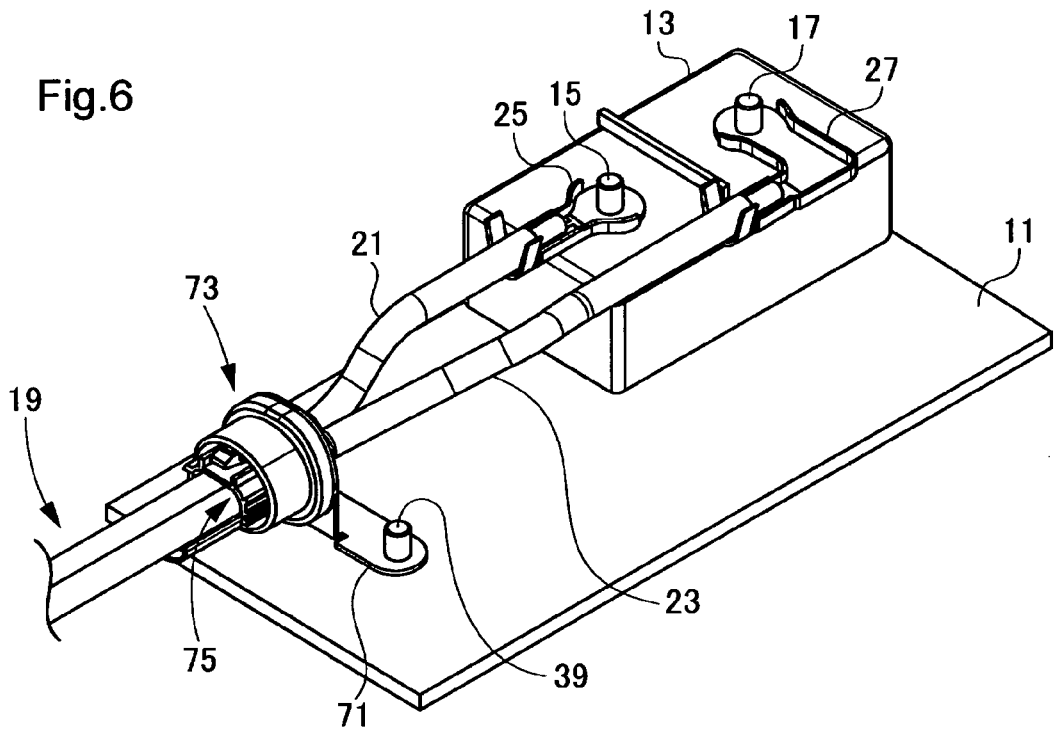
FIG. 6 is a perspective view of the wire harness having the fixed structure according to a comparative example and attached to the vehicle panel.
Figure 7:
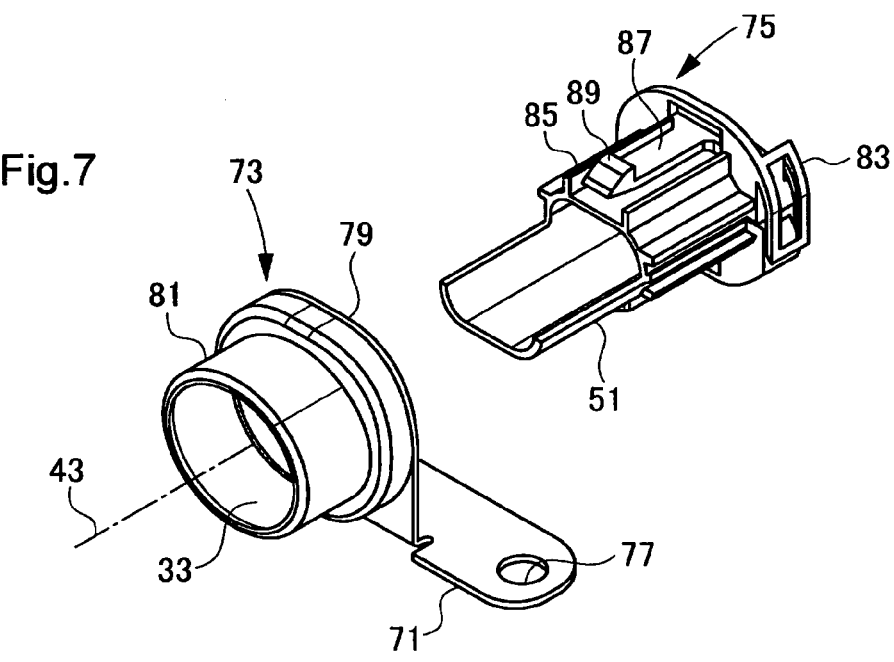
FIG. 7 is an exploded perspective view of the shield shell and the inner holder shown in FIG. 6.
Figure 8:
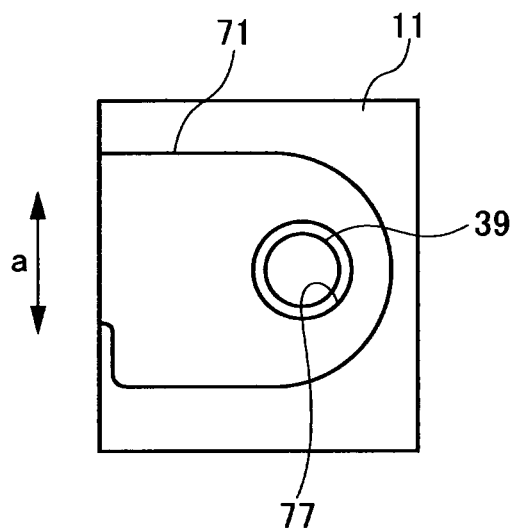
FIG. 8 is a plan view showing the fastening part between the shield shell and the vehicle stud bolt shown in FIG. 6.
Figure 9A:
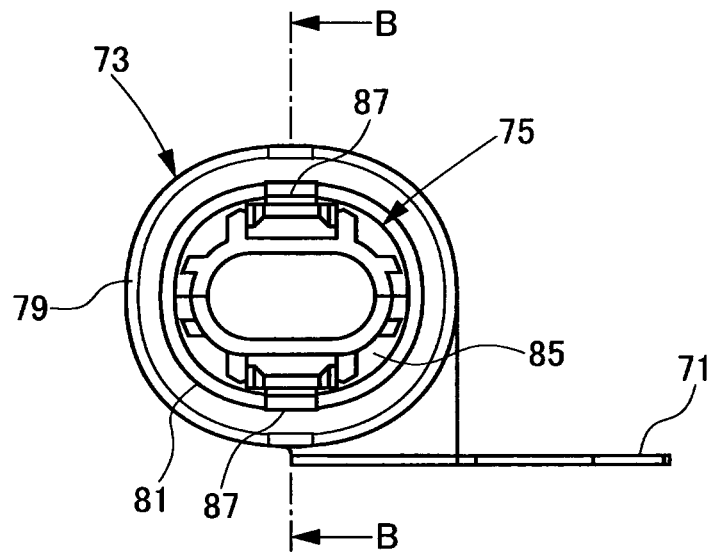
FIG. 9(a) is a sectional diagram along the direction orthogonal to the axis line of the shield shell and the inner holder shown in FIG. 6.
Figure 9B:
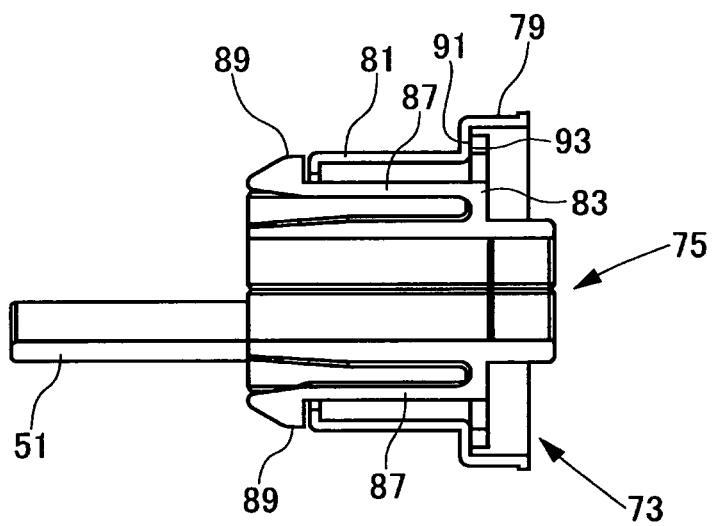
FIG. 9(b) is a sectional diagram cut along a line B-B in FIG. 9(a).
Figure 10A:
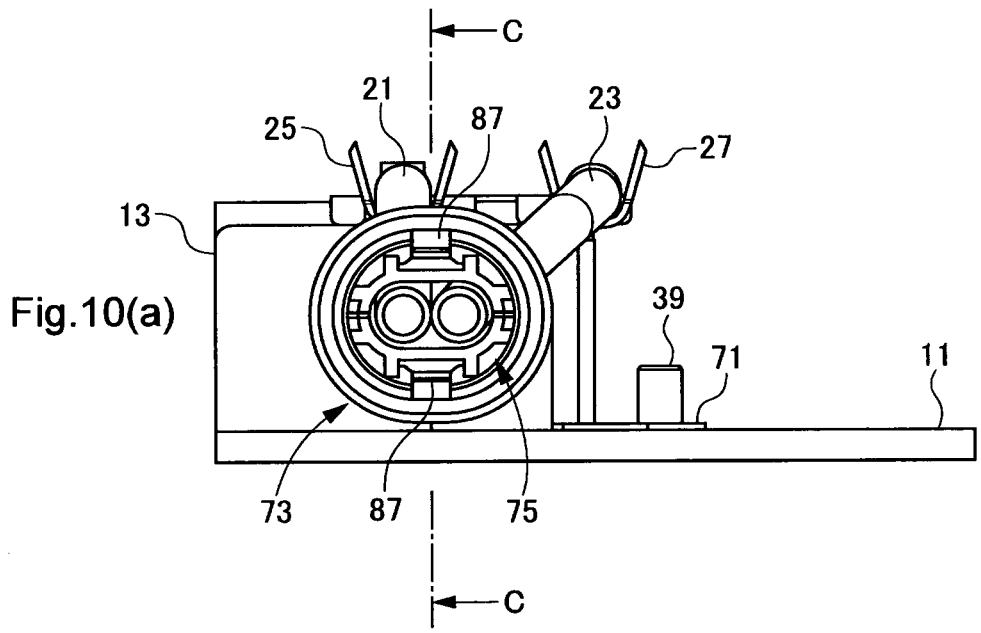
FIG. 10(a) is a sectional diagram along the direction orthogonal to the axis line of the shield shell and the inner holder shown in FIG. 6, (b) is a sectional diagram cut along a line C-C in FIG. 10(a)
Figure 10B:
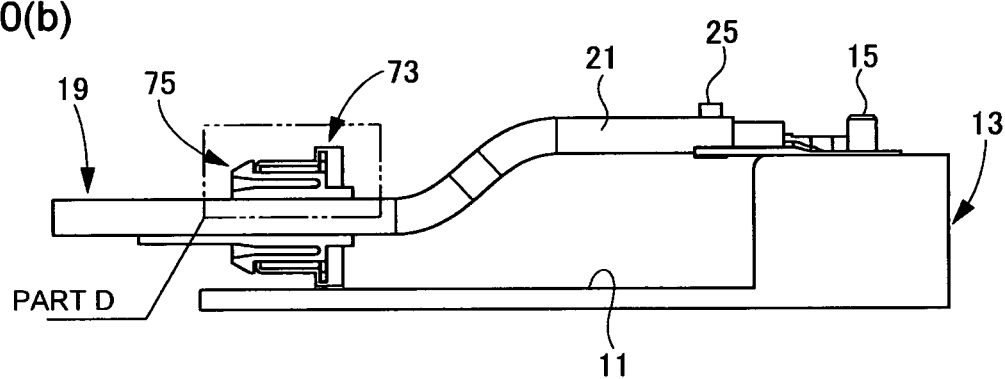
FIG. 10(c) is an enlarged diagram of a part D of FIG. 10(b).
Figure 10C:
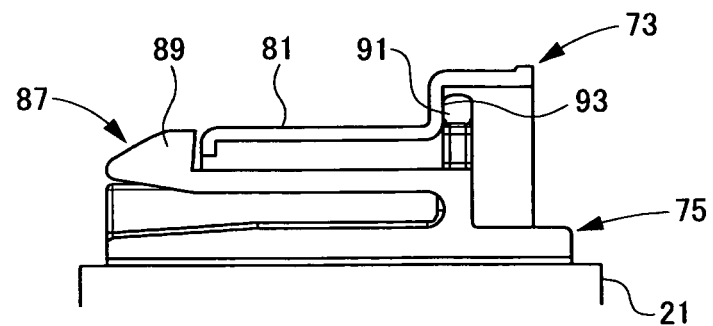

Next, the action of the tolerance absorbing structure for a wire harness configured in the aforesaid manner will be explained together with the action of a fixed structure having no tolerance absorbing structure according to a comparative example. FIG. 6 is a perspective view of the wire harness having the fixed structure according to the comparative example and attached to the vehicle panel, FIG. 7 is an exploded perspective view of the shield shell and the inner holder shown in FIG. 6, FIG. 8 is a plan view showing the fastening part between the shield shell and the vehicle stud bolt shown in FIG. 6, FIG. 9(a) is a sectional diagram along the direction orthogonal to the axis line of the shield shell and the inner holder shown in FIG. 6, FIG. 9(b) is a sectional diagram cut along a line B-B in FIG. 9(a), FIG. 10(a) is a sectional diagram along the direction orthogonal to the axis line of the shield shell and the inner holder shown in FIG. 6, FIG. 10(b) is a sectional diagram cut along a line C-C in FIG. 10(a), and FIG. 10(c) is an enlarged diagram of a part D in FIG. 10(b). Before the explanation of the action of the tolerance absorbing structure for a wire harness according to the invention, the explanation will be made as to the structure and action of the fixed structure according to the comparative example. In these figures, portions identical to those of FIG. 1 to 5 are referred to by the common symbols, with explanation thereof being omitted.

The fixed structure according to the comparative example is configured in a manner as shown in FIG. 6 that the high-voltage wire harness 19 in the vicinity of the terminal part 13 is fixed to the vehicle panel 11 by a shield shell 73 having a supporting piece 71 and an inner holder 75.

As shown in FIG. 7, the supporting piece 71 is provided with a round hole 77 fitting to the vehicle stud bolt 39. Thus, as shown in FIG. 8, the shield shell 73 is inhibited from moving in the direction of the axis line 43 (an arrow "a" direction in FIG. 8) with respect to the vehicle stud bolt 39. In the shield shell 73, a small diameter part 81 is provided so as to continue to a main body part 79. In the inner holder 75, a sleeve 85 is provided so as to continue to a holder main body 83. A pair of lances 87, 87 are provided on the outer periphery of the sleeve 85 at positions along the circumferential direction thereof, respectively. As shown in FIG. 9 (b), the lances 87, 87 acts to engage nail parts 89 thereof with the end part of the small diameter part 81 of the shield shell 73.

As shown in FIG. 9(b), in the inner holder 75, the abutment surface restriction part 91 of the holder main body 83 abuts against the abutment surface 93 of the shield shell 73 in a state that the nail parts 89 engage with the small diameter part 81. Thus, as shown in FIG. 10, in the fixed structure according to the comparative example, the shield shell 73 is provisionally fixed at its position after the shield shell 73 is provisionally assembled by the vehicle stud bolt 39. In a state where the lances 87 of the inner holder 75 engage with the small diameter part 81 of the shield shell 73, a sufficient space is not secured at each of a portion between the lances 87 and the end surface of the small diameter part 81 (lance engagement part) and a portion between the abutment surface 93 and the abutment surface restriction part 91. Thus, the inner holder 75 fitted into the shield shell 73 fixed to the vehicle panel 11 is restricted in its movement toward the direction of the axis line 43.

Figure 11A:
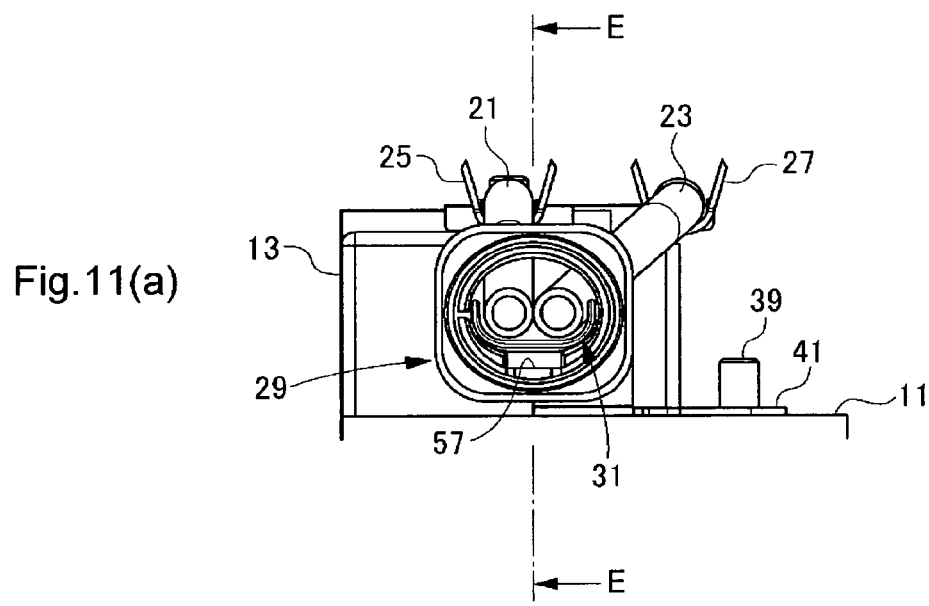
FIG. 11(a) is a sectional diagram along the direction orthogonal to the axis line of the shield shell and the inner holder shown in FIG. 1, (b) is a sectional diagram cut along a line E-E in FIG. 11(a)
Figure 11B:
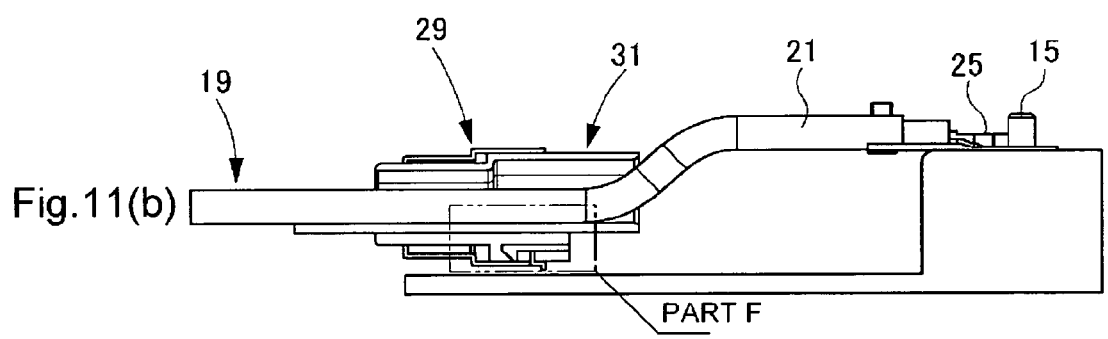
FIG. 11(c) is an enlarged diagram of a part F of FIG. 11(b).
Figure 11C:
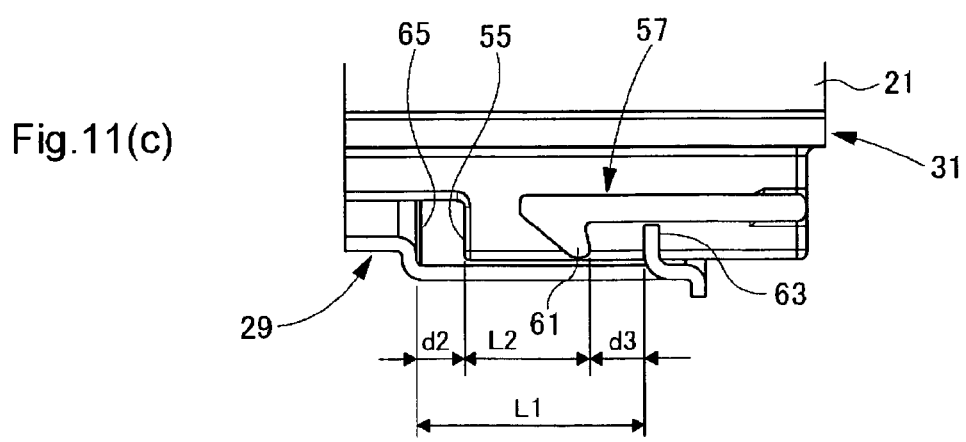

FIG. 11(a) is a sectional diagram along the direction orthogonal to the axis line of the shield shell and the inner holder shown in FIG. 1, FIG. 11(b) is a sectional diagram cut along a line E-E in FIG. 11(a) and FIG. 11(c) is an enlarged diagram of a portion F of FIG. 11(b). In contrast, in the tolerance absorbing structure for a wire harness according to the invention, since movable spaces d1, d1 along the axis line direction shown in FIG. 3 are provided between the vehicle stud bolt 39 and the supporting piece 41, the position of the shield shell 29 is not fixed and so the shield shell is movable within the movable spaces d1, d1 even after the shield shell is provisionally assembled by the vehicle stud bolt 39.

When the inner holder 31 is inserted into the shield shell 29, the lance 57 elastically deforms and enters into the fitting space 33. Then, when the lance moves over the lance engagement part 63, the lance engages with the lance engagement part 63 due to the elastic restoring force thereof. Thus, the inner holder is restricted from being separated from the shield shell toward the direction opposite to the insertion direction. On the other hand, when the inner holder is further moved toward the insertion direction, since the abutment surface restriction part 55 formed in the forward direction of the lance of the inner holder 31 abuts against the abutment surface 65 formed at the fitting space 33 of the shield shell 29, the inner holder is restricted from further moving in the insertion direction.

Accordingly, supporting that the position shown in FIG. 11(c) is a reference position, the inner holder 31 is movable with respect to the shield shell 29 in the direction of the axis line 43 by a distance d2 between the abutment surface restriction part 55 and the abutment surface 65 and by a distance d3 between the nail part 61 of the lance 57 and the lance engagement part 63. Thus, the high-voltage wire harness 19 is movable with respect to the vehicle panel 11 by an amount of these movable spaces.

Thus, according to the tolerance absorbing structure for a wire harness of the invention, since the inner holder 31 is held within the fitting space 33 of the shield shell 29 while securing the movable spaces d2, d3 in the direction of axis line 43, a failure of the assembling procedure at the time of mounting the wire harness on the vehicle can be prevented in advance. Further, since the assembling space can be saved due to the effects of the tolerance absorbance, the workability of the assembling procedure can be improved.

The present application is based on Japanese Patent Application No. 2009-116538 filed on May 13, 2009, the contents of which are incorporated herein for reference.

REFERENCE SIGNS LIST 21, 23 wire
29 shield shell
31 inner holder
33 fitting space
39 vehicle stud bolt
41 supporting piece
43 axis line
45 long hole
47 wire holding hole 55 abutment surface restriction part
57 lance
63 lance engagement part
65 abutment surface
L1 distance between abutment surface and lance engagement part
L2 distance between abutment surface restriction part and lance
d1, d2, d3 movable space

The invention claimed is:

1. A tolerance absorbing structure for a wire harness, comprising:
   a shield shell that is formed in a cylindrical shape so as to have a fitting space therein and has a supporting piece that protrudes in a direction perpendicular to an axis line direction of the fitting space, the shield shell including:
      a lance engagement part within the fitting space; and
      an abutment surface that is within the fitting space and separated from the lance engagement part in the axis line direction; and
   an inner holder configured to be inserted, along the axis line direction, into the fitting space of the shield shell so as to be held in a manner of being restricted from being separated from the shield shell and to extend beyond an end of the shield shell, the inner holder including:
      a wire holding hole for fixing wires whose lengths extend along the axis line direction and through the wire holding hole;
      an abutment surface restriction part configured to abut the abutment surface of the shield shell in order to restrict a degree in which the inner holder is insertable into the fitting space of the shield shell along the axis line direction; and
      a lance configured to engage with the lance engagement part of the shield shell in order to restrict a degree in which the inner holder is moveable along the axis line direction in the fitting space of the shield shell,
   wherein in response to the inner holder being inserted through the shield shell so as to extend from both sides of the shield shell, the inner holder is held within the fitting space of the shield shell so as to have a movable space in the axis line direction.

2. The tolerance absorbing structure for a wire harness according to claim 1, wherein the supporting piece of the shield shell is provided with a long hole for allowing the shield shell to relatively move in the axis line direction when the supporting piece is placed on a fastening surface.

3. The tolerance absorbing structure for a wire harness according to claim 1, wherein the movable space is defined by a difference in a distance between the lance engagement part and the abutment surface and a distance between the abutment surface engagement part and the lance.

4. A tolerance absorbing structure for a wire harness, the tolerance absorbing structure comprising:
   an inner holder that includes a wire holding hole for fixing wires that extend lengthwise in a first direction through the wire holding hole, a first structure, and a second structure separate from the first structure and beyond the first structure in the first direction; and
   a shield shell that includes a pathway with a closed-shape opening, a third structure, and a fourth structure beyond the third structure in the first direction, the pathway extends through the shield shell,
   wherein, in response to the inner holder being inserted into the shield shell, the first structure and the second structure are between the third structure and the fourth structure so that the inner holder is restricted from moving in the first direction once the second structure contacts the fourth structure and is restricted from moving in a second direction opposite the first direction once the first structure contacts the third structure.

* * * * *